United States Patent [19]

Dowell et al.

[11] 4,276,967
[45] Jul. 7, 1981

[54] SNUBBER ASSEMBLY

[75] Inventors: Terrence P. Dowell, Van Nuys; Edwin L. Banks, Jr., Lakeview Terrace; Carl T. Luce, Woodland Hills, all of Calif.

[73] Assignee: Barry Wright Corporation, Watertown, Mass.

[21] Appl. No.: 31,976

[22] Filed: Apr. 20, 1979

Related U.S. Application Data

[63] Continuation of Ser. No. 822,241, Aug. 5, 1977, abandoned.

[51] Int. Cl.³ ............................ F16F 7/06; F16F 7/10
[52] U.S. Cl. ..................................... 188/134; 188/185
[58] Field of Search ............. 188/1 B, 180, 184, 185, 188/129, 130, 134, 135, 136; 267/9 C

[56] References Cited

U.S. PATENT DOCUMENTS

| | | | |
|---|---|---|---|
| 1,633,984 | 6/1927 | Foruaca | 188/332 |
| 2,042,280 | 5/1936 | Stuart | 188/185 |
| 2,587,652 | 3/1952 | Rostine | 188/185 |
| 2,856,179 | 10/1958 | Hogan | 267/9 C |
| 2,995,327 | 8/1961 | Wood | 188/129 |
| 3,756,351 | 9/1973 | Sasaki | 188/129 |
| 3,876,040 | 4/1975 | Yang | 188/1 B |
| 3,983,965 | 10/1976 | Wright | 188/1 B |
| 4,054,186 | 10/1977 | Banks et al. | 188/184 |
| 4,094,387 | 6/1978 | Pelat et al. | 188/1 B |
| 4,177,882 | 12/1979 | Dowell et al. | 188/185 |

FOREIGN PATENT DOCUMENTS

| | | |
|---|---|---|
| 2420541 | 11/1974 | Fed. Rep. of Germany ........... 188/1 B |
| 232115 | 4/1925 | United Kingdom . |
| 234848 | 11/1925 | United Kingdom . |
| 664273 | 1/1952 | United Kingdom . |
| 737935 | 10/1955 | United Kingdom . |
| 999553 | 7/1965 | United Kingdom . |
| 1356232 | 6/1974 | United Kingdom . |

Primary Examiner—Edward R. Kazenske
Attorney, Agent, or Firm—Milton E. Gilbert

[57] ABSTRACT

Acceleration initiated, velocity limiting self-actuating mechanical relative motion, controlling device having a pair of elements telescopically interconnected for relative motion with respect to each other with a braking surface preferably as an integral part of one of the elements and an interconnecting assembly for converting linear relative displacements of the elements to rotary motion of the internally supported braking mechanism comprising a primary brake assembly preferably coupled to increase mechanical gain and movable into engagement with the braking surface, a freely rotating first mass element to provide relative motion sensitivity, a brake actuating assembly coupling the mass element and the primary brake assembly for causing same to impede relative linear motion of the elements and a velocity sensitive braking assembly actuatable at a given angular velocity to impede rotation of the same element and thereby increase and sustain the braking force applied by the primary brake assembly. The preferred embodiment also includes a secondary mass element rotatably supported on the first mass element for movement with respect to same for prolonging the application of the brake actuating assembly against the primary brake assembly by impeding rebound of the brake actuating assembly from the primary brake assembly after initial contact.

7 Claims, 16 Drawing Figures

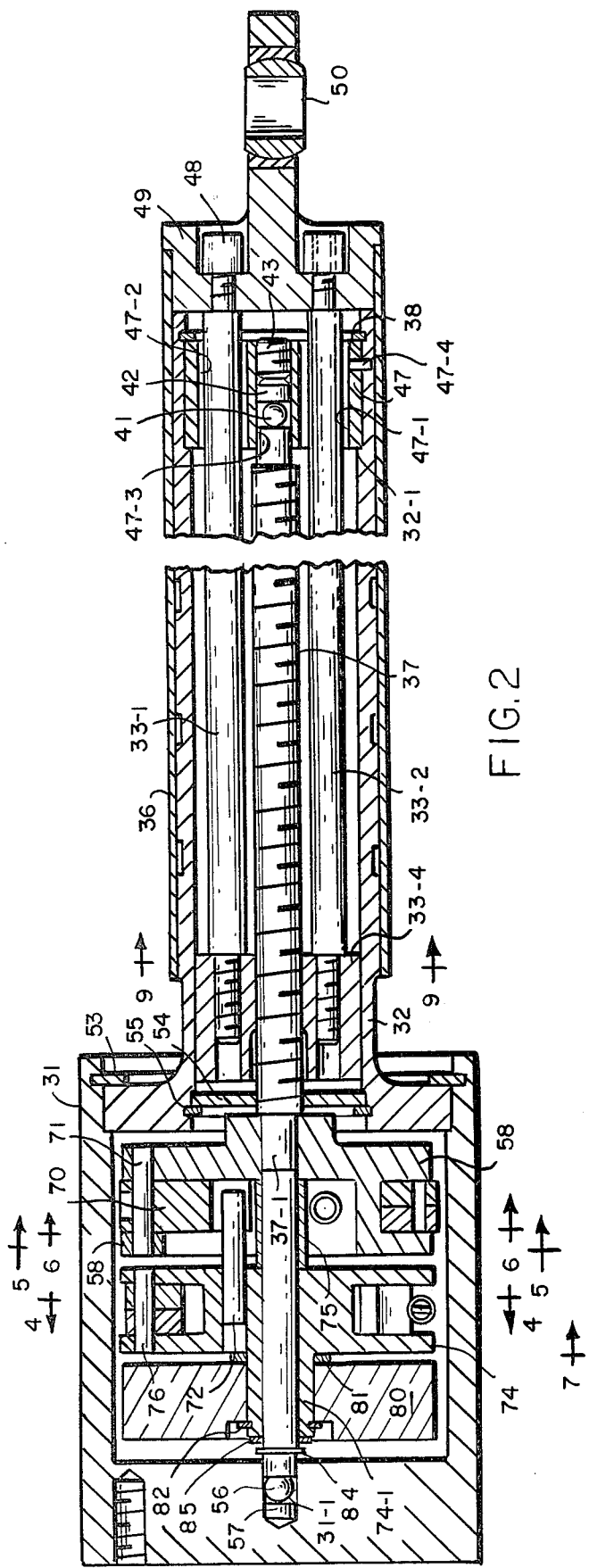
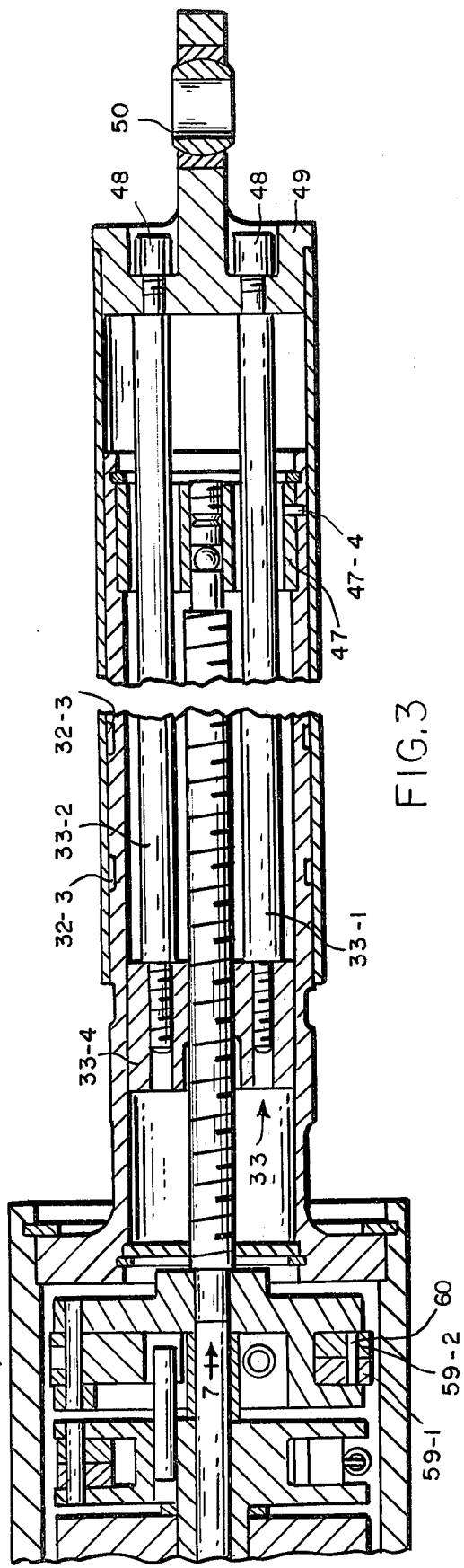
FIG.2
FIG.3

SNUBBER ASSEMBLY

This is a continuation of application Ser. No. 822,241 filed Aug. 5, 1977 now abandoned.

BACKGROUND OF THE DISCLOSURE

This invention relates to snubbers or shock absorbing mechanisms of the type which are used to protect portions of power plant or process industry piping and equipment. In particular, said snubbers are used to protect piping and equipment by resisting the acceleration and relative motion of same under earthquake conditions and other dynamic loadings associated with the operation of extensive piping installations. The relative motion controlling device of this invention also provides freedom of movement of the piping during normal operating conditions such as thermal expansion and contraction.

While mechanical snubbers employing telescoping elements and having an inertia mass actuated braking scheme have been available in the prior art, they have not to date been able to provide the advantages of this invention. With this invention, relative velocity is limited and controlled so that sudden destructive stops are avoided if the snubber elements reach their maximum extent of travel and the braking force generated by the device is proportional to the external forces impressed thereon.

In this invention reinforcement of the primary braking is provided by the use of velocity sensitive brakes which are applied when the elements are separating or moving towards each other above a given velocity. The velocity sensitive brake means of this invention not only provides braking in its own right, but also as applied in this invention creates a sustaining action that causes the primary brakes to be applied with a force proportional to the relative velocity of said telescoping elements.

In this invention a new and improved high gain primary braking system is provided which uses multiple braking contact areas and interactive feedback of same to create a controllable and predictable gain in excess of expected stable values. In this invention a secondary mass element is used to provide sensitivity and response of the self-actuating braking system to frequencies of about 3 HZ and thus limit displacement of said elements and provide protection in the high energy-low frequency spectrum of seismic activity.

Thus the present invention with the advantages as disclosed herein is particularly useful for restraining and controlling excessive motion of piping and equipment in nuclear power plants should such piping and/or equipment be subjected to an earthquake or system induced dynamic loading that could cause pipe rupture or equipment damage as a result of excessive acceleration and/or relative motion.

BRIEF DESCRIPTION OF THE DISCLOSURE

This invention is directed to a family of acceleration initiated velocity limiting self-actuating mechanical braking assemblies each basically identical in principle but somewhat different in detail from one another to meet a particular load requirement. Thus each of the different embodiments shown are the preferred embodiments of the basic invention for a specific dynamic load capacity in pounds (lbs.).

In particular, the various embodiments shown herein are means to provide dynamic load capacities, of at least 500, 1000, 3000 and 10,000 lbs., in the configurations as shown. However, it should be understood that the embodiments shown are not limited to these given load capacities and in fact the embodiments described may be used to meet other load capacities.

In each of the configurations shown, two elements or members are telescopically interconnected with one another for relative motion and any excessive movement or relative acceleration of the members or elements in either direction causes a primary brake system to be actuated through the inertial characteristics of a free rotating mass element thereby controlling and limiting the maximum relative acceleration and velocity.

In the preferred embodiment of the invention herein the primary or main brake means comprises at least two brake shoes with multiple braking contact areas hinged or pinned to each other and actuated by a lever coupled to the mass element. Because of their configuration, the primary brake shoes herein create an interactive force feedback from one brake shoe to a second brake shoe after one brake shoe is urged into braking contact with a braking surface by the actuating lever, thereby providing an extremely high gain braking system.

In addition to the above, an angular velocity actuated brake system is provided in the preferred embodiment in order to limit the velocity of said telescopic elements with respect to one another. Said velocity actuated brake system is preferably supported by the free rotating mass element to cause the primary brakes to be applied in a sustained manner if the relative translational velocity of the elements (either in an inwardly or outwardly direction) exceed an acceptable velocity. The invention herein also preferably includes a secondary mass or damper which is frictionally coupled to the free rotating first mass (inertia mass) and rotatable about a shaft member extending from said free mass to prolong the engagement of the brake actuating means and thereby prevent rebound of the primary brakes from the braking surface after making initial contact therewith.

Thus with the multiple stage mass elements of the preferred embodiments, it is now possible to effectively limit relative displacement of the housing elements at frequencies near 3 HZ.

BRIEF DESCRIPTION OF THE FIGURES

FIG. 2 is a sectional view of a snubber having at least a 1000 lb. dynamic load capacity taken along line 2—2 in FIG. 1 showing the snubber in a retracted condition;

FIG. 3 is a partial sectional view taken similar to FIG. 2 showing the snubber in a partially extended condition;

DETAILED DESCRIPTION OF THE DISCLOSURE

Figure 1:
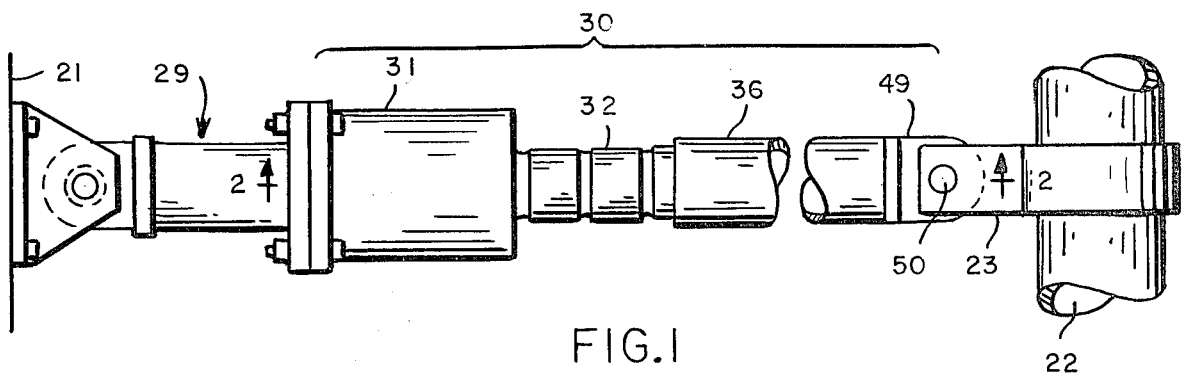
FIG. 1 is a side elevational view of a snubber of this invention as installed in a piping system.

FIG. 1 depicts the outward appearance of each of the four different load capacity snubbers of this disclosure. The snubber is shown at 30 and comprises a brake housing 31 and upper housing 32 (both forming a single element or member). The housing 31 is optionally coupled to an extension member and clevis plate assembly 29 e.g., by bolts which in turn is coupled to a support e.g., a wall 21. The opposite end of the snubber comprises an end fitting member 49 which moves inwardly or outwardly with respect to the housings 31 and 32.

The end fitting member contains a bearing 50 preferably spherical to provide a pin connection to a coupling member 23 which is secured to a pipe 22.

Figure 6:
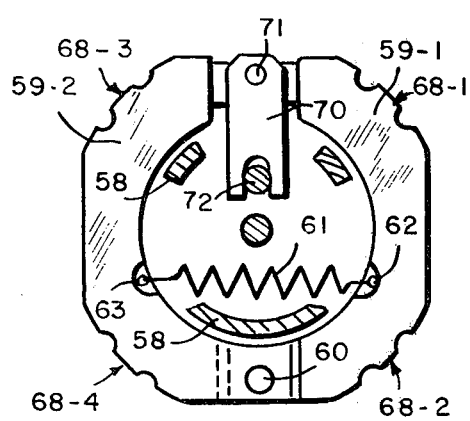
FIG. 6 is a sectional view taken along line 6—6 in FIG. 2 showing the primary brake shoes.
Figure 7:
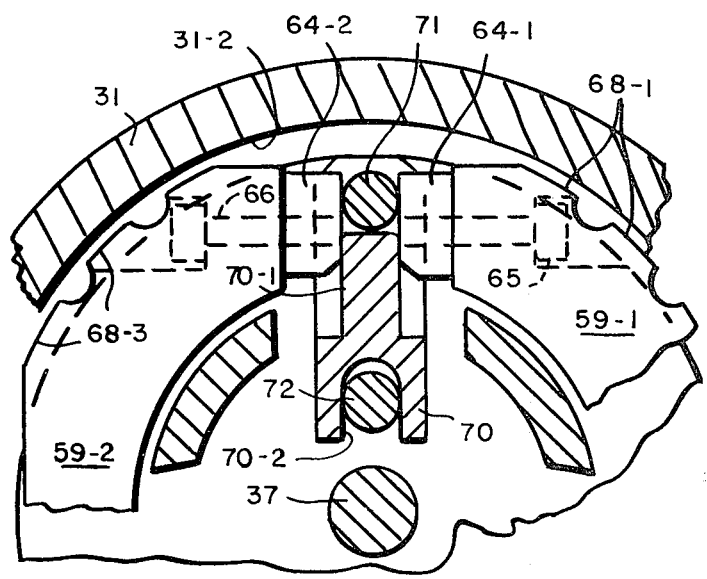
FIG. 7 is an enlarged partial sectional view taken along line 7—7 in FIG. 3.
Figure 8:
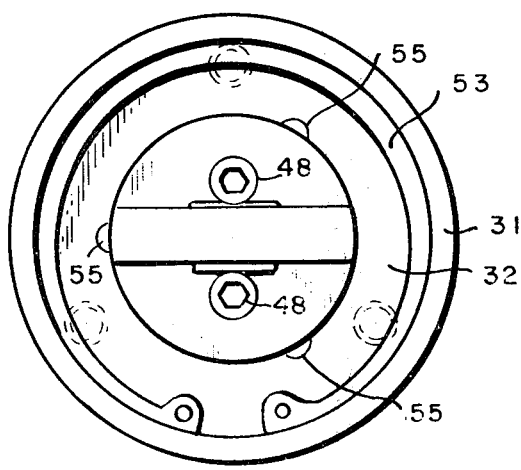
FIG. 8 is an end view taken from the right of FIG. 2.

A dust cover 36 is coupled to the end fitting member 49 by drive screws or similar means 55 (see FIG. 8). Reference should now be had to FIGS. 2 to 11 as well as FIG. 1 for a more detailed description of a snubber having at least a 1000 lb. load capacity.

Internal to upper housing 32 there is provided a load rod assembly comprising two rods 33-1 and 33-2 which are each connected at their one end to the end fitting member 49 by internal wrenching nuts 48 and threadedly connected to a conventional ACME nut 33-4 at their other ends. The rods 33-1 and 33-2 are guided for translational movement by a guide plate 47 having holes 47-1 and 47-2. The guide plate 47 is held in place at once end by a retaining snap ring 38 and at its other end by a shoulder 32-1 in the upper housing 32. The ACME nut 33-4 is threadedly connected to a shaft or screw 37 which is positioned at one end in a bearing pocket 47-3 within said guide plate 47.

The said one end of the shaft 37 engages a ball bearing 41 which in turn engages a bearing pad 42 whose position is set by set screw 43.

The shaft 37 is supported by guide washer 54 which is held in place by retaining ring 55 against a shoulder of the upper housing 32. The opposite end of the shaft 37 is supported in bore 31-1 in the brake housing 31 against a ball bearing 56 and bearing pad 57. The upper housing 32 is retained to the brake housing 31 by retaining ring 53.

The shaft 37 is provided with a knurled section 37-1 and the primary brake assembly including driver 58 is forced on the knurled section to provide a friction fit therewith. The driver 58 thereby rotates with shaft 37 as it is rotated by the translational motion of ACME nut 33-4. The driver supports the primary brake system comprising brake shoes 59-1 and 59-2 held together by pin 60 (about which they pivot) and are confined about the driver 58 by a spring 61 engaged in holes 62 and 63 of the brake shoes 59-1 and 59-2 respectively, as shown in FIG. 6.

The brake shoes 59-1 and 59-2 are each provided with a hardened brake actuation bearing pad 64-1 and 64-2 respectively which is affixed thereto by bolts 65 and 66 (see FIG. 7). Each of the brake shoes have multiple outer brake surfaces 68-1 and 68-2, for brake shoe 59-1 and 68-3 and 68-4, for brake shoe 59-2 (see FIG. 6), for engagement with the braking surface 31-2 on the inside of the brake housing 31.

The driver 58 also pivotally supports a brake actuating lever 70 by means of pin 71. The center section 70-1 (see FIGS. 7 and 10) is adapted to engage the brake bearing pads 64-1 or 64-2 depending upon the direction in which it is pivoted to urge the leading brake shoe surfaces against the braking surface 31-2.

Figure 11:
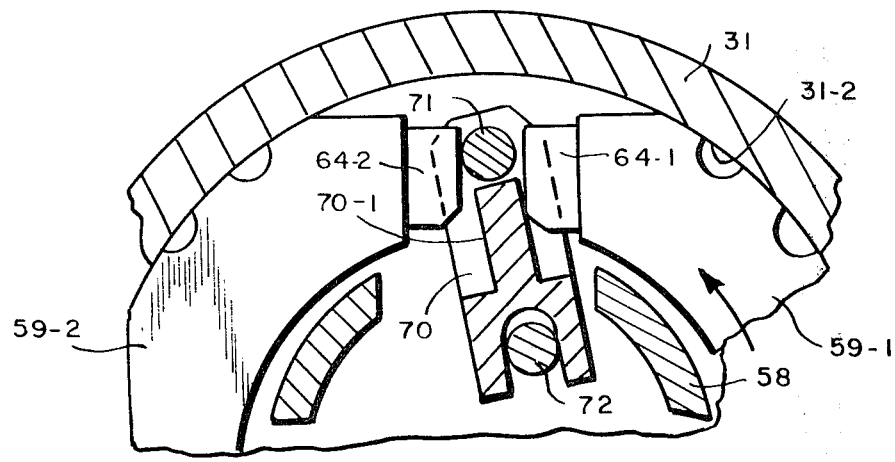
FIG. 11 is a view similar to FIG. 7 showing the primary brake shoes in the actuated position.

As viewed in FIG. 11 taken with FIG. 6 the leading brake shoe, e.g. 59-1, is urged outwardly towards braking surface 31-2 causing the surface at 68-1 to first engage the braking surface 31-2 by camming against the center section 70-1 of lever 70. The friction force so developed seats the second set of braking surfaces 68-2 of the leading shoe 59-1 against the braking surface 31-2 which provides an additive friction force and the sum of said forces is transmitted to the other, trailing, brake shoe 59-2 whereby its two sets of braking surfaces 68-3 and 68-4 are urged into contact with said braking surface 31-2 and its bearing pad 64-2 is thereby forced against pin 71. The summation of the developed friction force is thus transmitted through driver 58 to the shaft 37 thereby resisting the rotation motion created by the forced translation of nut 33-4. The angular positions of the four sets of braking surfaces of brake shoes 59-1 and 59-2 determine the servo feedback gain of the primary brake means and thereby the unique efficiency of the brake system of this invention.

The lever 70 is provided with a slot 70-2 at its lower end in which there is positioned pin 72. The pin 72 is fixed to the mass element 74 so that differential angular motion between said mass element 74 and said driver 58 causes lever 70 to pivot and urge the primary brake shoes 59-1 and 59-2 outwardly to cause braking of the linear motion of the end fitting member 49 with respect to the element or member comprising the housings 31 and 32.

The mass element 74 with its brake actuating pin 72 is free to rotate on the shaft 37 but is held in a neutral angular position relative to the driver and primary brake mechanism by the force of spring 61. When shaft 37 and driver 58 are rotated slowly, e.g., when pipe 22 is undergoing thermal caused motion, this neutral relationship is maintained. However, any instantaneous rotation of said shaft-driver due to an acceleration or rapid separation of the element 49 with respect to the element comprised by housings 31 and 32, causes relative angular displacement of the mass element 74 and the driver 58.

Figure 4:
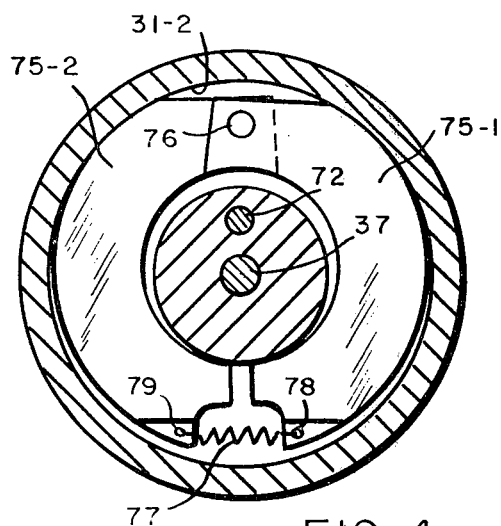
FIG. 4 is a sectional view taken along line 4—4 in FIG. 2 showing velocity brakes of the invention in the retracted position.
Figure 5:
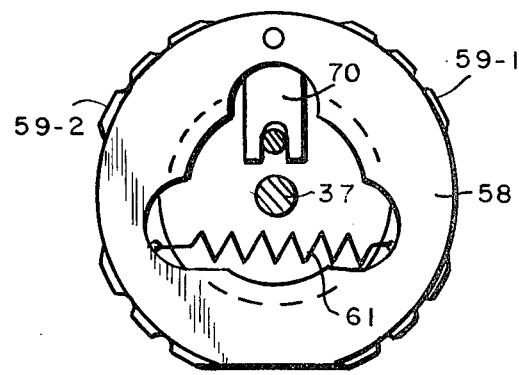
FIG. 5 is a sectional view taken along line 5—5 in FIG. 2 showing the primary brake shoes installed in the driver according to the invention.

Pin 72 will cause pivoting of lever 70 and actuation of the primary brake shoes. Said mass element 74 supports a pair of angular velocity sensitive brake shoes 75-1 and 75-2 pinned together and coupled to said inertia mass by pin 76. Said brake shoes are normally held within the confines of the mass element 74 by spring 77 whose ends are hooked into holes 78 and 79 in shoes 75-1 and 75-2 respectively as shown in FIG. 4.

The velocity sensitive brake shoes 75-1 and 75-2 will move outwardly when the angular velocity of mass element 74 increases to a predetermined level. The brake shoes 75-1 and 75-2 will then engage another portion of braking surface 31-2 and cause the mass element to be forceably rotated by the driver 58 and its resistance to such rotation will cause the primary brake shoes to be applied with additional force through pin 72 as previously described.

As shown in FIG. 2 the mass element 74 also includes a portion 74-1 which acts as a shaft for a secondary mass 80. Said secondary mass or damper is coupled to the free rotating mass 74 by a preloaded spring washer 81 and retaining ring 82. The secondary mass 80 as shown will rotate together with the free mass element 74 under sustained rotation in one direction, however, it will rotate about section 74-1 to counteract a sudden forced reversal of the free mass, e.g., when the device experiences reciprocating loads or when said mass element 74 initially causes application of the primary brakes 59-1 and 59-2.

The inertia mass 74 is held in place at the end of the shaft 37 by washer 85 and retaining ring 84 as shown in FIG. 2. The housing 32 is provided with grooves 32-3 (see FIG. 3) in and about the housing outer surface which act as a visual measurement of displacement position as well as to permit any entrapped dirt to dissipate and not restrict the smooth translational motion of said housing cover 36 and the attached end fitting member 49.

In actual use, the base of the unit (brake housing 31) is attached to a support structure as shown in FIG. 1, and the end fitting member 49 is attached to the pipe 22 to be protected. As the end fitting 49 is moved inward, it causes the two rods 33-1 and 33-2 to which it is attached, to slide through the guide plate 47. The guide plate 47 is secured within the upper housing with a snap ring 38, and is prevented from rotating by an anti-rotation pin 47-4 (see FIG. 3).

The rods attach on their opposite ends to an ACME nut 33-4. An inward motion of the nut will cause the shaft 37 to rotate counterclockwise when viewed from end fitting 49. The application of a constant low velocity force to said end fitting will allow the mass element 74, which rides on but is not fixed to the shaft 37, to rotate in phase with the driver 58 which is fixed to the shaft 37 whereas an inward acceleration of the end fitting will again cause the driver 58 to rotate counterclockwise but the inertial characteristics of mass 74 resist rotation and thereby causes relative motion of said elements. This out of phase condition will cause pin 72 in the mass element to pivot brake lever 70 in a counterclockwise direction about the brake lever retaining pin 71 engaging the bearing pad on one brake shoe and causing said brake shoe to engage the inner diameter 31-2 of the housing 31.

The frictional force generated by this brake shoe, due to the rotation of the driver-brake assembly, is thereby transferred through the hinge pin 60 to the other brake shoe and thereby to retaining pin 71. The forced rotation of driver 58 is thus resisted. In the event of a sustained force applied to the end fitting 49 the driver 58 will rotate the mass element 74 through the brake lever 70 and interconnecting pin 72. At a given velocity the centrifugal force of the free mass brake shoes 75-1 and 75-2 will exceed the force of the restraining spring 77 and cause said brake shoes to pivot outwardly and contact braking surface 31-2, producing added resistance to rotation and thereby increasing the actuating force on the primary brakes.

Reversing the direction of applied motion or force reverses the rotations and force vectors on the driver, primary brake shoes, brake lever, and free rotating mass element.

Figure 12:
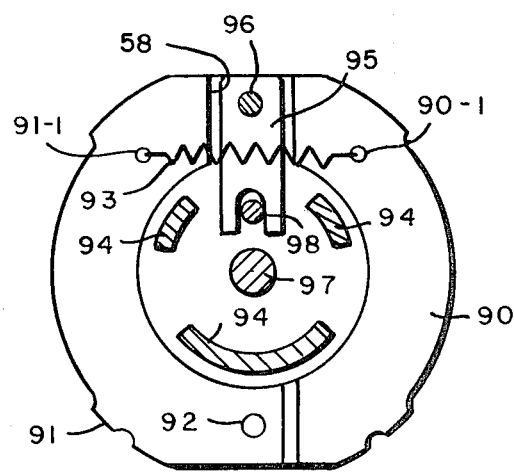
FIG. 12 is a view similar to FIG. 6 showing the variation in the primary brake configuration for a snubber having at least a 500 lb. dynamic load capacity in comparison with the snubber of FIGS. 1 to 11.
Figure 9:
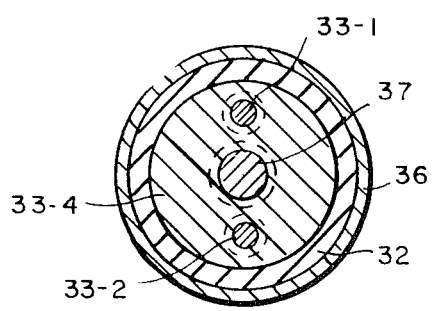
FIG. 9 is a sectional view taken along line 9—9 in FIG. 2.

In FIG. 12 (a view taken in the same manner as FIG. 6) there is shown the primary brake configuration for the snubber having at least a 500 lb. load capacity. However, it should be understood that the general embodiment of this snubber and the initially described snubber functions in the same manner.

The view of FIG. 12 shows two brake shoes 90 and 91 pinned together by pin 92 and now held together by an upper located spring 93 coupled to pins 90-1 and 91-1 on the respective brake shoes. The driver cross section is shown as 94 and the lever is shown as 95. The lever 95 as before is pivotally coupled to the driver by pin 96 and the driver is coupled to the shaft or screw 97.

The lever 95 is pivoted by pin 98 coupled to a free mass element 74 as in FIGS. 1 to 11.

Figure 13:
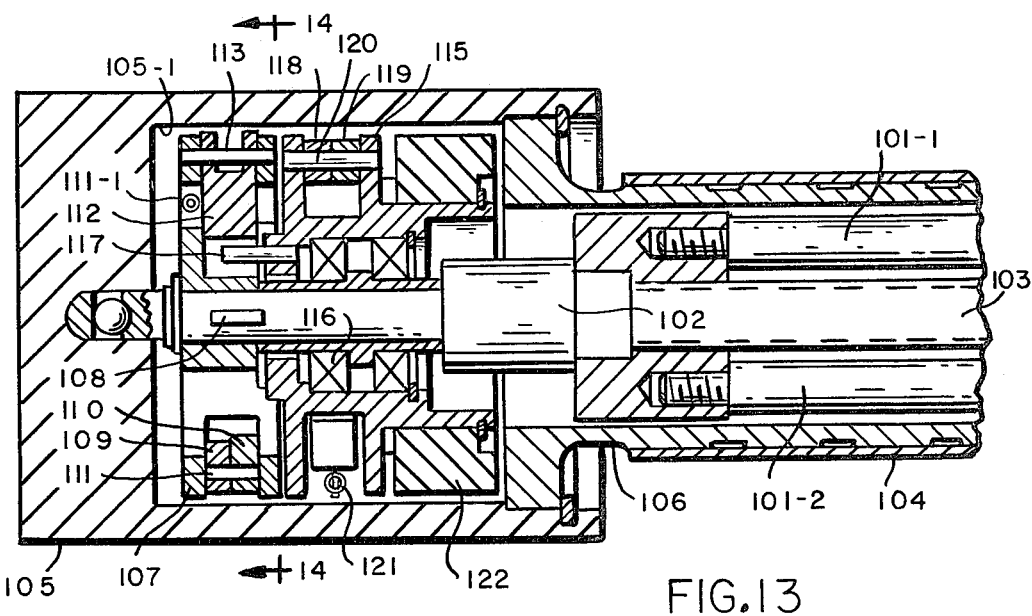
FIG. 13 is a sectional view similar to FIG. 2 showing a snubber having at least a 3000 lb. dynamic load capacity.
Figure 14:
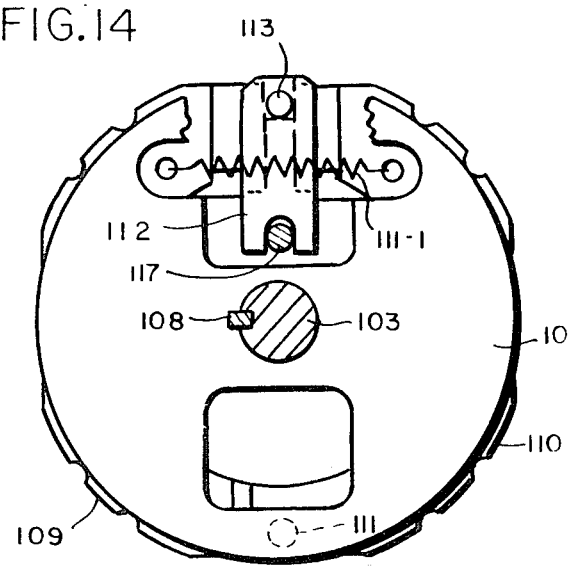
FIG. 14 is a sectional view taken along line 14—14 in FIG. 13 showing the primary brake configuration with a partial breakaway in the area of the actuating lever.

Reference should now be had to FIGS. 13 and 14 which show the internal positional differences between this snubber and the snubbers previously described. However, it should be understood that functionally these three devices operate in the same manner.

In FIG. 13 the load rods are shown at 101-1 and 101-2 which are threadedly connected to a ball nut assembly 102 to drive it back and forth about the threads of a ball screw or shaft 103. The dust cover 104, the brake housing 105 and the upper housing 106 correspond to the similar elements previously shown in FIG. 2. The shaft 103 is keyed to a driver 107 (now at the far left of FIG. 13) by a Woodruff key 108 or similar means.

Thus the driver 107 rotates with the shaft 103. The primary brake shoes 109 and 110 correspond to brake shoes 59-1 and 59-2 are pivotally pinned together by pin 111.

Figure 10:
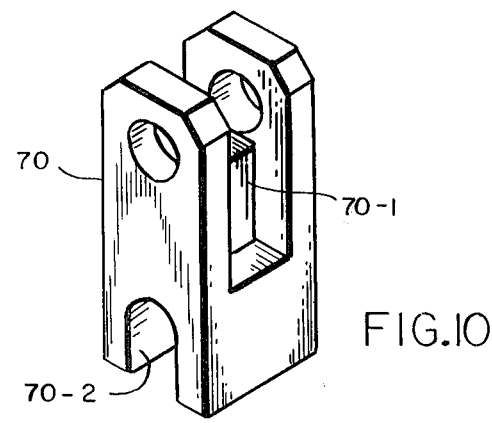
FIG. 10 is a view of the primary brake actuating lever.

Spring 111-1 is affixed to each of the brake shoes and holds said brake shoes in position about the driver 107. A brake actuating lever 112 of the same shape as shown in FIG. 10 is coupled to the driver 107 by pin 113.

At 115 there is shown a rotatably mounted free mass element supported about ball bearing assembly 116 to provide the sensitivity to angular motion required for primary brake actuation as previously described.

The mass element 115 supports pin 117 which moves lever 112 to urge the primary brakes against braking surface 105-1. Velocity sensitive brake shoes are provided at 118 and 119 and are pinned to the mass element 115 by pin 120.

A spring 121 is coupled to the opposite end of the angular velocity sensitive brake shoes 118 and 119 in the same manner as shown in FIG. 4 for brake shoes 75-1 and 75-2. The secondary mass is shown at 122 mounted about the free rotating mass 115, and it functions in the same manner as secondary mass 80 of the prior devices of FIG. 1 to 12.

Figure 15:
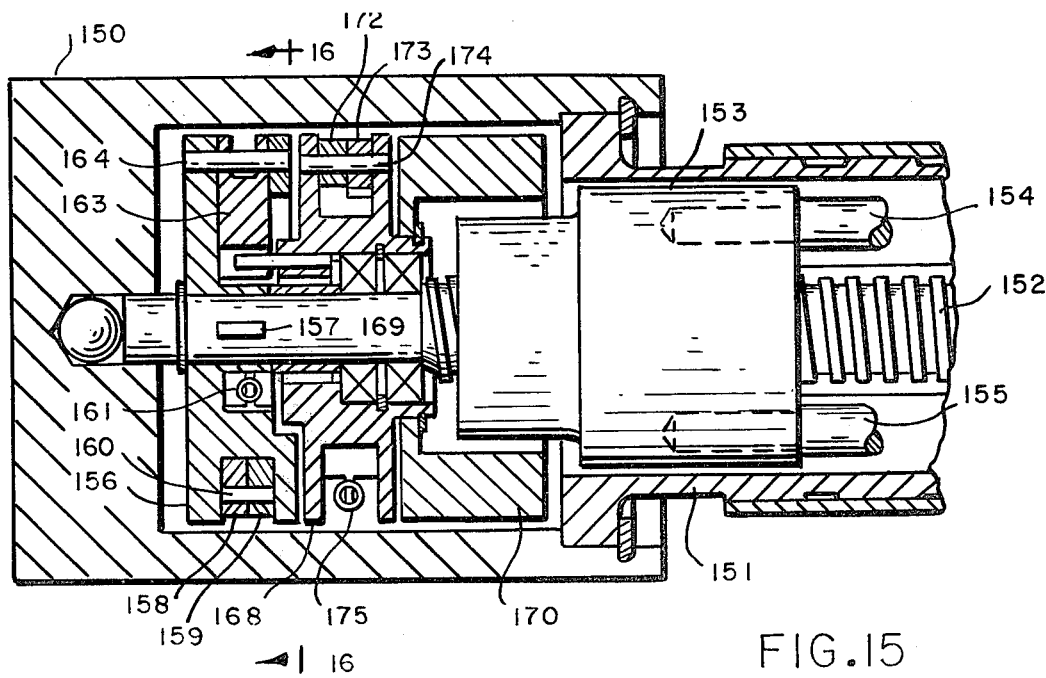
FIG. 15 is a sectional view similar to FIG. 2 showing a snubber and having at least a 10,000 lb. dynamic load capacity.
Figure 16:
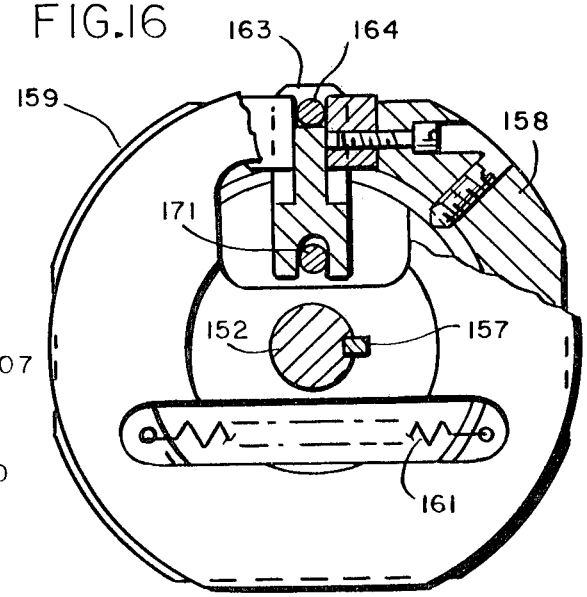
FIG. 16 is a sectional view taken along line 16—16 in FIG. 15 showing the primary brake configuration with a further portion being broken away to show the lever and brake pad of one brake shoe.

In FIGS. 15 and 16 there is shown a snubber having capacity of at least 10,000 lbs. In these figures, there is shown brake housing 150 and upper housing 151. A ball screw 152 is coupled to a ball nut assembly 153 and is driven by load rods 154 and 155.

A driver 156 is keyed by a Woodruff key 157 or similar means to shaft 152 and supports primary brake shoes 158 and 159. The brake shoes are held together by pin 160 and spring 161 coupled to each shoe. The lever is shown at 163 which is pivotally coupled to driver 156 by pin 164. A freely rotatable mass 168 is supported by a ball bearing assembly 169 which in turn frictionally supports thereon a secondary mass 170 which reacts as previously described. Velocity sensitive brake shoes 172 and 173 are coupled by pin 174 to said mass element, and spring 175 holds said velocity sensitive brake shoes in position about said mass element.

It should be understood that any type of screw and nut assembly or the like converting translational motion to rotary motion as disclosed herein may be used.

The above embodiments are at present the preferred manner of providing various sized devices, however, it should be understood that modifications of the embodiments disclosed herein may be made while still coming within the scope and extent of the invention. The devices described herein may be made of various metals such as steel, as would be well known to those skilled in the art.

We claim:

1. A snubber comprising first and second concentric arranged elements, means for mounting said elements for telescopic motion relative to each other along a common axis, a shaft axially fixed relative to said first element and rotatable by said second element, a braking surface on said first element, a driver fixed to said rotatable shaft for rotation therewith, a primary brake assembly mounted on said driver, an inertia mass supported by said shaft and freely rotatable about said shaft relative to said driver, brake actuating means interconnecting the inertia mass and the primary brake assembly, said inertia mass being rotated by said brake actuating means, said primary brake assembly being applied to said braking surface when acceleration between elements exceeds a predetermined value of acceleration causing the inertia mass to rotationally lag the driver and a velocity sensitive brake assembly mounted on the inertia mass and operable by centrifugal force when the rate of rotation of the inertia mass exceeds a predetermined value of velocity to frictionally engage said braking surface to brake rotation of said inertia mass to thus increase the force applied by the primary brake assembly through said brake actuating means whereby the force is increased due to the aforementioned lagging of the inertia mass.

2. The snubber according to claim 1 wherein said brake actuating means comprises a lever, a pivot pin supported by said driver and supporting said lever for pivotal motion and a pin supported by said inertia mass and positioned to engage said lever to operate said primary brake assembly.

3. The snubber according to claim 2 in which said primary brake assembly comprises a pair of brake shoes pivotly coupled together at one end, said lever moveable to cause only one brake shoe to be moved against the braking surface by said lever.

4. The snubber according to claim 3 in which said primary brake assembly includes a spring for urging the brake shoes against the pivot pin of said brake actuating means.

5. The snubber according to claim 1 in which said velocity brake assembly comprises a pair of brake shoes coupled by a pin to said inertia mass.

6. A snubber comprising first and second concentric arranged elements, means for mounting said elements for telescopic motion relative to each other along a common axis, a shaft axially fixed relative to said first element and rotatable by said second element, a braking surface on said first element, a driver fixed to said rotatable shaft for rotation therewith, a primary brake assembly mounted on said driver, a first inertia mass supported by said shaft and freely rotatable about said shaft relative to said driver, brake actuating means interconnecting the inertia mass and the primary brake assembly, said inertia mass being rotated by said brake actuating means, said primary brake assembly being applied when acceleration between elements exceeds a predetermined value of acceleration causing the inertia mass to rotationally lag the driver, a velocity sensitive brake assembly mounted on the inertia mass and operable by centrifugal force when the rate of rotation of the inertia mass exceeds a predetermined value of velocity to frictionally engage said braking surface to brake rotation of said inertia mass to thus increase the force applied by the primary brake assembly through said brake actuating means, whereby the force is increased due to the aforementioned lagging of the inertia mass, and a second inertia mass, said first inertia mass having a shaft portion upon which the second inertia mass is mounted for free rotation, and means for frictionally connecting said second inertia mass to said first inertia mass, said second inertia mass acting to increase the period of time said primary brake assembly is applied after contact is made by the primary brake assembly with said braking surface.

7. The snubber of claim 6 in which said means for frictionally connecting said first and second inertial masses comprises a spring washer.

* * * * *